United States Patent [19]

Siotani

[11] Patent Number: 4,861,257

[45] Date of Patent: Aug. 29, 1989

[54] CORE STRUCTURE OF MOLDING APPARATUS

[75] Inventor: Masao Siotani, Kitakyushu, Japan

[73] Assignee: Toto Ltd., Kitakyushu, Japan

[21] Appl. No.: 201,516

[22] Filed: Jun. 1, 1988

[30] Foreign Application Priority Data

Jun. 5, 1987 [JP] Japan .................. 62-142073

[51] Int. Cl.$^4$ ............................................. B29C 43/00
[52] U.S. Cl. .................................... 425/438; 249/175;
249/180; 249/183; 249/184; 279/2 R
[58] Field of Search ............... 249/63, 177, 178, 179,
249/180, 183, 184, 186, 180, 184, 183; 279/2 R;
425/417, DIG. 5, DIG. 34, 457; 242/72.1;
106/417; 72/393; 156/417

[56] References Cited

U.S. PATENT DOCUMENTS

| | | | |
|---|---|---|---|
| 292,167 | 1/1884 | Lytle | 279/2 |
| 2,394,503 | 2/1946 | Wilson | 242/72.2 |
| 2,403,147 | 7/1946 | Westergaard | 242/72.1 |
| 2,890,490 | 6/1959 | Morin | 249/184 |
| 3,018,518 | 1/1962 | Jeffreys | 156/417 |
| 3,228,678 | 1/1966 | Koger | 279/2 |
| 3,420,537 | 1/1969 | Walters | 279/2 |
| 3,482,815 | 12/1969 | Naturale | 249/180 |
| 3,549,158 | 12/1970 | Smith | 279/002 |
| 4,130,264 | 12/1978 | Schröer | 425/417 |
| 4,392,899 | 7/1983 | Bertoldo | 156/417 |

Primary Examiner—Willard Hoag
Attorney, Agent, or Firm—Jordan and Hamburg

[57] ABSTRACT

The core structure of a molding apparatus for making a molded article is disclosed. The cylindrical core which forms a plurality of main core members separated by a plurality of wide slits and a plurality of complementary core members which are inserted and fastened in the slits can be independently manufactured and thereafter assembled. Accordingly, the main core members, without the complementary core plate members being attached, provide sufficiently wide machining or grinding clearance to allow speedy machining or grinding on the side faces of the main core members. The complementary core members, as well, may be machined and ground quite readily and accurately. The cylindrical core members and the complementry core members can be produced in high precision so that the assembling of the members to form a cylindrical core structure also can be carried out precisely or accurately and such core structure can be installed in the molding apparatus precisely. Accordingly, the manufacture of highly precise molded articles becomes possible.

6 Claims, 7 Drawing Sheets

CORE STRUCTURE OF MOLDING APPARATUS

BACKGROUND OF THE INVENTION

The present invention relates to the core structure of a molding apparatus used for making hollow molded articles having an undercut or internal threading such as a container cap and the like made of plastic or other materials, by a molding process.

One typical example of the conventional core structures used for an apparatus for making a molded article is disclosed in U.S. Pat. No. 3,247,548.

Figure 18:
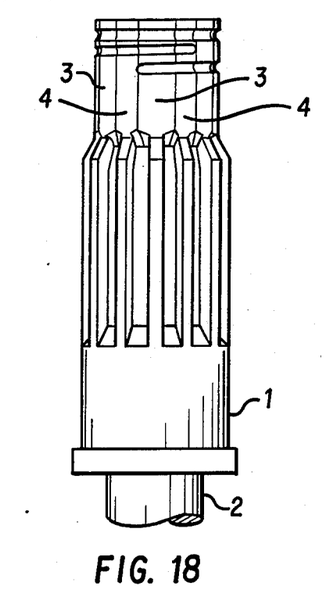
FIG. 18 to FIG. 20 are explanatory views showing the conventional core structure of the molding apparatus.
Figure 19:
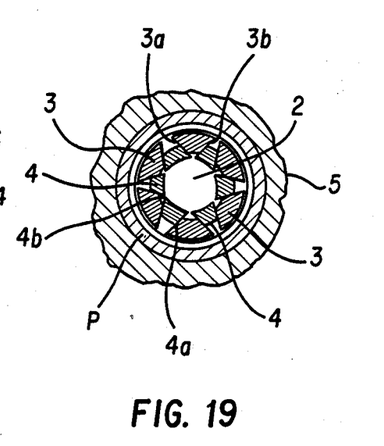
Figure 20:
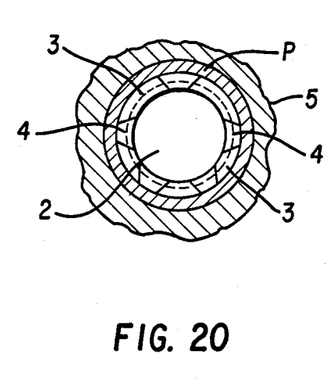

Such core structure, as shown in FIG. 18 to FIG. 20, substantially comprises a cylindrical body (1) and a core expanding rod (2) which is reciprocably movable in the cylindrical body (1) for radially outwardly expanding said cylindrical body.

The cylindrical body (1) has the upper portion thereof longitudinally divided into a plurality of circumferentially disposed sections and such sections are made of a plurality of core members (3) with a radially outwardly expanding cross section and a plurality of core members (4) with a radially inwardly expanding cross section, wherein the core members (3) and (4) are circumferentially alternately disposed.

The core members (3) and (4) are usually resiliently retracted in the radially inward direction as shown in FIG. 19, while the core members (4) are disposed more radially inwardly from the core members (3).

On molding, the inserting of the core-expanding rod (2) into the inside of the main cylindrical body (1) allows the core members (3) and (4) to expand radially outwardly and to form a molding surface on the outermost surface of the core members (3) and (4) as shown in FIG. 20 and such molding surface, in cooperation with the metal mold (5), can provide a molding space for molding a molded article (P) such as a container cap.

Figures 7, 8, 9:
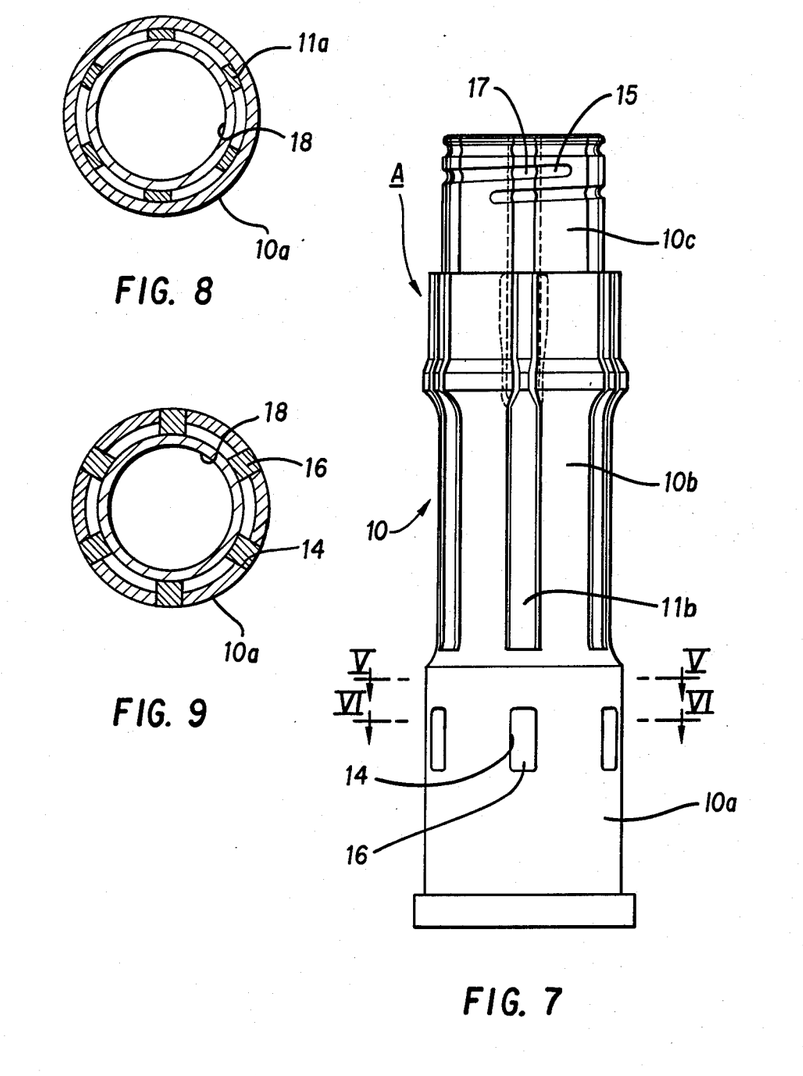
FIG. 7 is an elevational view of the assembly of the cylindrical core and complementary core members.
FIG. 8 and FIG. 9 are, respectively, fragmentary sectional views of complementary core members taken along line V—V and VI—VI in FIG. 7.
Figure 10:
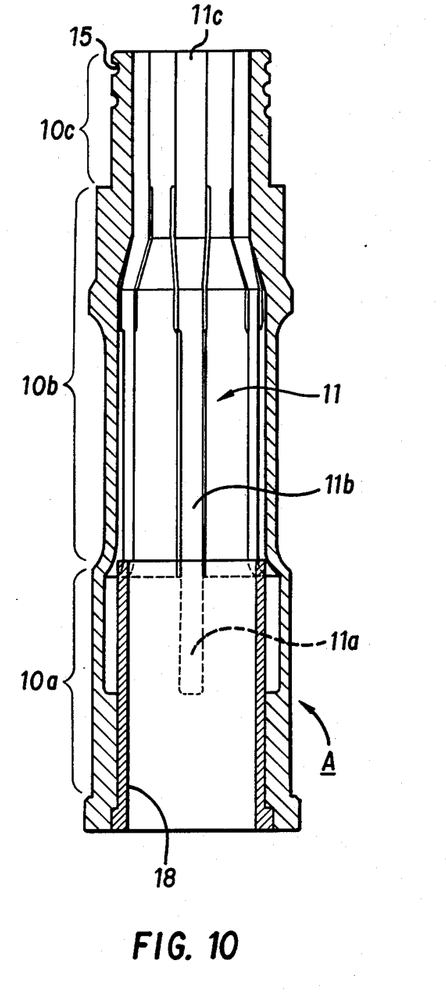
FIG. 10 and FIG. 11 are longitudinal cross sectional views of the assembly of the cylindrical core and the complementary core members seen at different angles.
Figure 11:
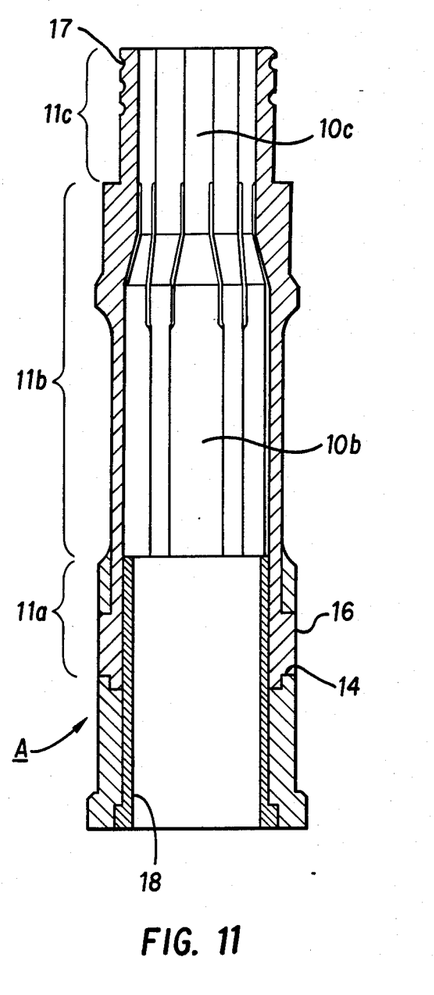

After molding, the axial withdrawal of the rod (2), which causes the resilient retraction of the cores (3) and (4) in the radially inward direction, allows the molded article (P) to separate in such a manner as shown in FIG. 9 so that the molded article (P) may be readily removed from the metal mold (5).

Such conventional core structure for molding apparatus, however, has following drawbacks, (a) Such core structure is made as an integral unit or as one piece. In manufacturing the core, though the cylindrical body (1) has been cut into a plurality of divided core members (3) and (4) by metal-saw cutting, the cutting clearance (circumferential width of cut) is too narrow to make the cut easily and gives the machined surfaces (3a), (3b), (4a), and (4b) a rough finish, resulting in poor contact or abutting between the core members (3) and the core members (4).

(b) For improving the surface condition of the machined surfaces in general, a finishing by grinding or milling is utilized. However, it is impossible to apply such finishing to the machined surfaces (3a), (3b), (4a), and (4b), which have an extremely narrow clearance or gap therebetween.

Accordingly, such core members (3) and (4) cannot be precisely assembled resulting in low manufacturing yield of the core and high manufacturing costs.

(c) The molded articles which are produced by the above members also exhibit a poor precision.

Accordingly, it is an object of the present invention is to provide a core structure of a molding apparatus for making a molded article which may solve the problems associated with an inherent in the prior art.

In summary, this invention relates to the core structure of a molding apparatus for making a molded article comprising a) a cylindrical core of which a part is resiliently retractable in the radially inward direction, the core having the part longitudinally divided into a plurality of main core members which are circumferentially disposed at a predetermined distance while forming a plurality of longitudinal slits between each two main core members, the slit having a wide and arcuate cross section, b) a plurality of complementary core members corresponding to the shape of the slits, the complementary core members capable of being assembled in the slits for forming a cylinder together with the core members and c) a core-expanding rod, which is axially inserted into the cylindrical core to expand radially the main core members and the complementary core members causing the radially expanded outermost surfaces of the main core members and the complementary core members to form a cylindrical smooth surface whereon the article is molded.

Due to such construction, the present invention has following advantages.

(1) The cylindrical core which is in the form of a plurality of main core members separated by a plurality of wide slits and a plurality of complementary core members which are inserted and fastened in the slits can be independently manufactured and thereafter assembled. Accordingly, the main core members, without the complementary core plate members being attached, provide sufficiently wide machining clearance to allow speedy machining on the side faces of the main core members by a milling cutter in place of a metal saw. Moreover, a subsequent grinding process can be also readily carried out. This makes it possible to manufacture highly precise cylindrical cores at a lower cost.

(2) The complementary core members, as well, may be machined and ground quite readily and separately from the main core members. This makes it possible, as well, to manufacture more precise complementary core members at a lower cost.

(3) The cylindrical core members and complementary core members can be produced in high precision as mentioned above so that the assembling of these members to form a cylindrical core structure also can be carried out precisely or accurately and such core structure can be installed in the molding apparatus precisely. Accordingly, the manufacture of highly precise molded articles becomes possible.

BRIEF DESCRIPTION OF DRAWINGS

The objects and features of the invention may be understood with reference to the following description of illustrative embodiments of the invention, taken together with the accompanying drawings in which.

DETAILED DESCRIPTION OF PREFERRED EMBODMIENTS

The preferred embodiments of this invention are described in detail in accordance with the attached drawings.

Figure 1:
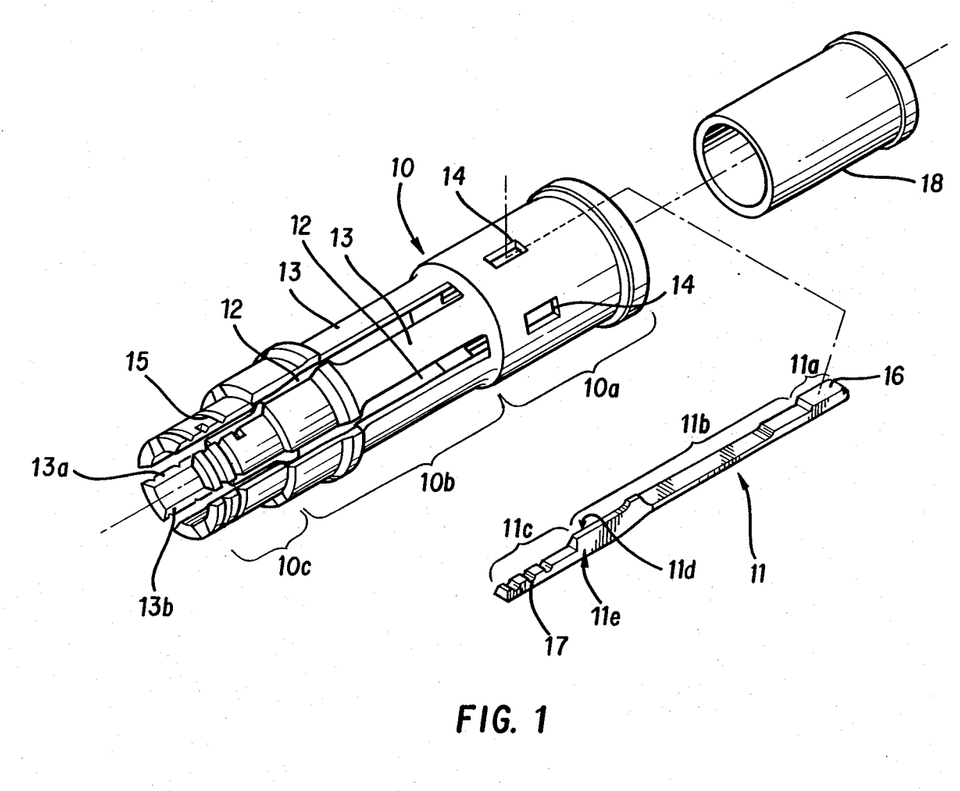
FIG. 1 is a perspective general view of the cylindrical core and the complementary core members which are assembled to form the core structure of this invention.

FIG. 1 shows the general structure of a cylindrical core (10) and a plurality of complementary core members (11) which are assembled into the cylindrical core (10), wherein both elements forms essential parts of this invention.

The structure of the cylindrical core (10) is firstly explained referring to FIG. 2—FIG. 6.

Figure 2:
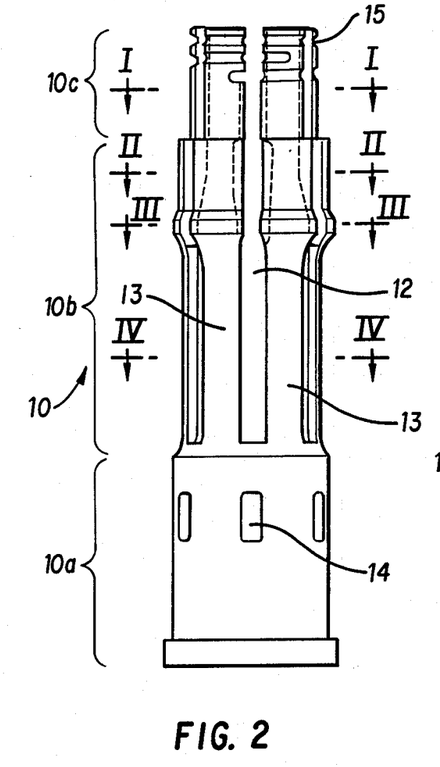
FIG. 2 is an elevational view of the cylindrical core.
Figure 3:
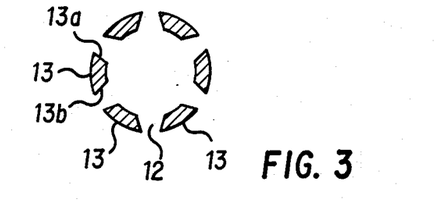
FIG. 3 to FIG. 6 are respective sectional views of the cylindrical core taken along the lines I—I, II—II, III—III and IV—IV of FIG. 2.
Figure 4:
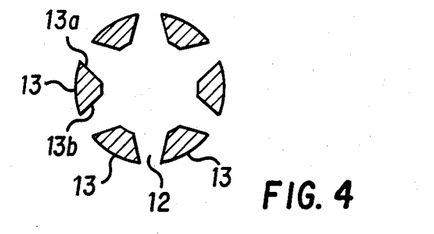
Figure 5:
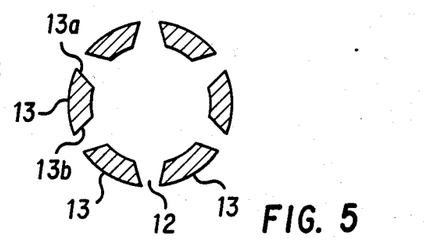
Figure 6:
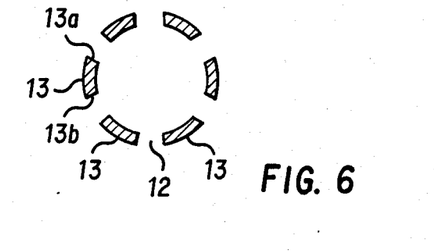

As shown in FIG. 1 and FIG. 2, the cylindrical core (10) substantially comprises a main cylindrical core body (10a) supported by a support plate (25) which will be described later (refer to FIG. 14), an intermediate cylindrical core body (10b) which is integrally formed with the main cylindrical core body (10a) in the upper position, and a cylindrical molding core body (10c) which is integrally formed with the intermediate cylindrical core body (10b) in the upper position.

In the intermediate cylindrical core body (10b) and the cylindrical molding core body (10c) of the cylindrical core (10), a plurality of longitudinal slits (12) having a wide and tapered cross section are formed in a circumferentially spaced-apart manner.

Between the slits (12), a plurality of longitudinal main core members (13) are formed, which have the proximal end thereof integrally connected with the main cylindrical core body (10a).

The cylindrical core (10) is provided with a plurality of openings (14) for attaching the complementary core members (11) on the circumferencial wall of the main cylindrical-core body (10a) at a position which is located on an extension of the longitudinal slits (12).

The cylindrical core (10) is also provided with an annular threaded groove (15) for providing a threaded protrusion on the inner face of a molded article (P) by molding as explained later.

FIG. 3 to FIG. 6 show the cross sectional views taken at various level of the portion of the cylindrical core (10) where the longitudinal slits (12) are formed.

In this embodiment, as described above, the longitudinal slits (12) formed in the cylindrical core (10) have a width or a clearance sufficiently wide for machining, provided that the complementary core plate members (11) are not attached or assembled.

Therefore, the surfaces (13a) and (13b) formed on both sides of the main core members (13 can be readily and precisely machined by a milling cutter in place of a metal saw.

Furthermore, after the above machining is completed, the surfaces (13a) and (13b) can be readily ground by a grinding stone and the like so that the highly precise or accurate cylindrical core (10) can be manufactured at a lower cost.

The complementary core members (11), which are attached to the abovementioned cylindrical core (10), are hereinafter explained in view of FIG. 1.

The complementary core member (11) comprises a core attachment portion (11a) that is attached to the main cylindrical core body (10a), an intermediate inserting portion (11b) that is inserted in the intermediate cylindrical core portion (10b), and a molding portion (11c) that forms a molding cylindrical surface (F) (refer to FIG. 14) in cooperation with the cylindrical molding core (10c).

In FIG. 1, numeral (16) indicates an insert projection formed on the radially outermost surface of the core attachment portion (11a) of the complementary core member (11) while numeral (17) indicates an annular threading groove formed on the molding portion (11c). This threading groove (17) and the threaded groove (15) previously described, are used for making an annular groove for providing a spiral protrusion on the inner surface of the molded article F or an annular space for accomodating an O-ring or other annular packing.

The manner in which the above-mentioned complementary core members (11) are attached to the cylindrical core (10) is explained hereinafter in view of FIG. 7 to FIG. 1.

The inserting projections (16) formed on the attachment portion (11a) are inserted into the inserting openings (14) of the main cylindrical core body (10a) of the cylindrical core (10), while the intermediate inserting portions (11b) and the molding portions (11c) are both simultaneously inserted in the slits (12) of the cylindrical core (10).

In this embodiment, in order to securely connect in one piece the complementary core members (11) to the cylindrical core (10), a cylindrical stopper (18) in FIG. 1 is firmly inserted into the inside of the main cylindrical core body (10a) of the cylindrical core (10) in such a way that between the circumferential outer face of the stopper and the circumferential inner face of the main cylindrical core body (10a), the attachment portion (11a) of the complementary core plate members (11) is pressed and held in place as shown in FIG. 7 to FIG. 11.

The core structure of the present invention can be completely constructed by axially inserting a core-expanding rod (20) which will be described later into the cylindrical core (10) which is equipped with the complementary core members (11).

The complementary core members (11), however, are completely separated from the cylindrical core (10) as shown in FIG. 1 until they are fitted into said cylindrical core (10).

Therefore, the surfaces (11d) and (11e) of the complementary core members (11) which are to be machined can quite readily and quickly be cut by the milling cutter, and thereafter can be readily and quickly ground by a grinding wheel and the like as in the case of the main core members (13) of the cylindrical core (10). This will make it possible to manufacture highly precise complementary core members (11) at a lower cost as the cylindrical core (10).

In this embodiment, as mentioned above, the precision of both cylindrical core (10) and the complementary core members (11) can be improved upon, enabling them to be more readily and correctly assembled into the core of the apparatus for making a molded article and mounted on the apparatus, and resulting in producing a highly precise molded article (P).

The cylindrical core (10) and the complementary core members (11), after being machined and ground, are subjected to a heat treatment to give them resiliency and are then assembled.

In the above embodiment, the attaching of the complementary core members (11) to the cylindrical core (10) may also be performed by welding and bolting instead of using the stopper (18).

Figure 12:
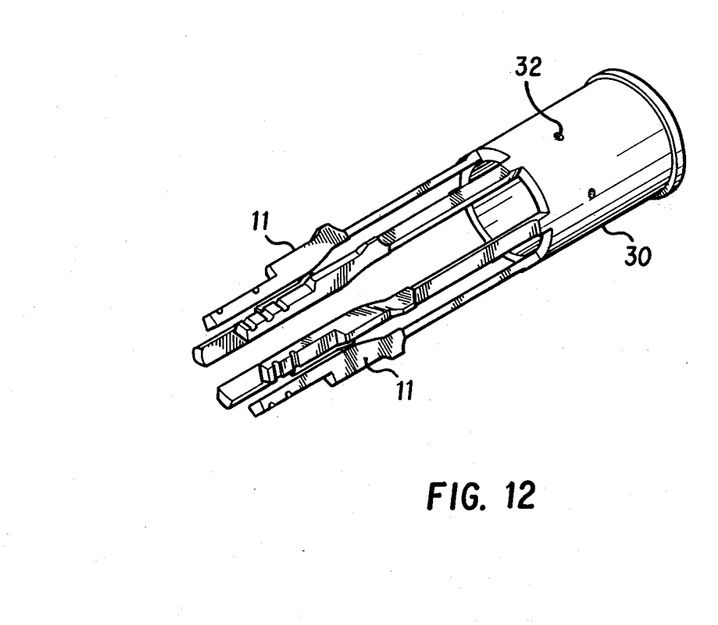
FIG. 12 shows a fragmentary perspective view of an embodiment of another type of complementary core members used.
Figure 13:
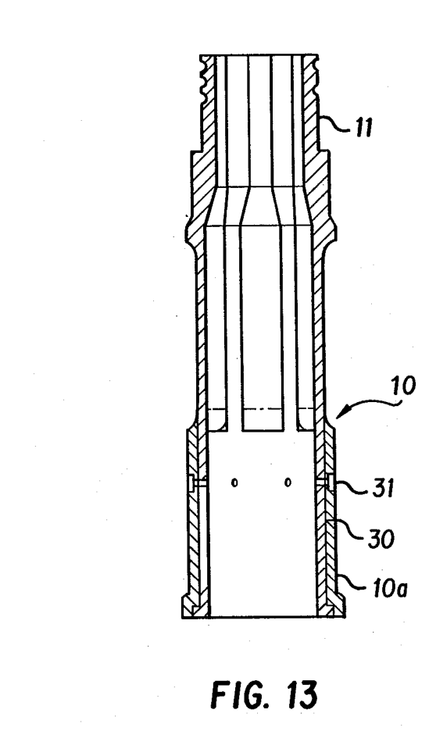
FIG. 13 is a longitudinal cross sectional view of an assembly of the complementary core members and the cylindrical core.

The core structure of the molding apparatus of the present invention may be in the shape or contour as disclosed in another embodiment of FIG. 12 and FIG. 13.

Namely, a plurality of complementary core members (11) are continuously or integrally connected to a cylindrical base member (30) and the assembly (A) is formed by attaching and fastening and cylindrical base member (30) to the main cylindrical core body (10a) of the cylindrical core (10) by means of fastening bolts (31). Numeral (32) indicates a plurality of female threaded screw holes (32).

In this embodiment, the surfaces to be machined on the main core members (13) of cylindrical core (10) and the complementary core plate members (11) can be extremely easily and quickly machined by a milling cutter and afterwards the grinding work may be conducted as easily and quickly, enabling highly precise cylindrical core (10) and complementary core plate members (11) to be manufactured at a low cost. Assembling and mounting of the core structure for molding apparatus may also be performed easily and precisely so as to produce the highly precise molded article (P).

Figure 14:
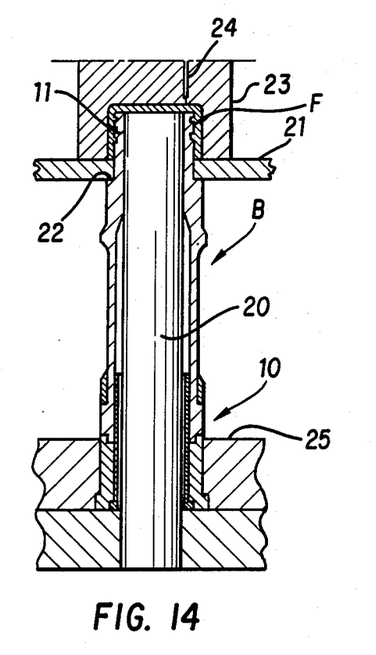
FIG. 14 and FIG. 15 are explanatory views explaining the manner of molding a molded article.
Figure 15:
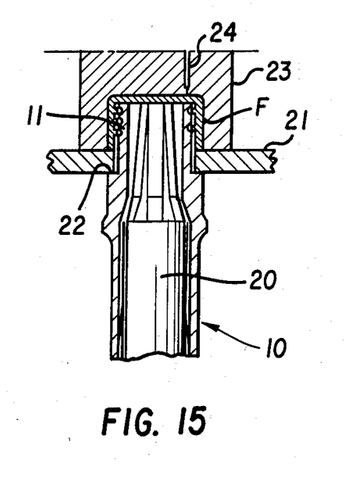

FIG. 14 and FIG. 15 show the assembled condition of the core structure of this embodiment to a molding apparatus (B).

In these drawings, numeral (20) indicates the core-expanding rod axially elevatably inserted into the cylindrical core (10), numeral (21) indicates a lower metal mold to contact an annular shoulder portion formed on the upper part of the cylindrical core (10) and numeral (23) indicates an upper mold metal member disposed on the lower mold (21) and the upper mold (23) can form a mold cavity for molding an article such as a container cap and the like together with the lower mold (21), the main core members (13) of the cylindrical core (10) and the complementary core members (11).

Numeral (24) indicates a mold gate for introducing the mold material such as plastics into the mold cavity (23), while numeral (25) in FIG. 14 indicates a support plate which supports the main cylindrical core body (10a) of cylindrical core (10).

The manner in which the molding is carried out with the core structure of the present invention is briefly described hereinafter.

Figure 16:
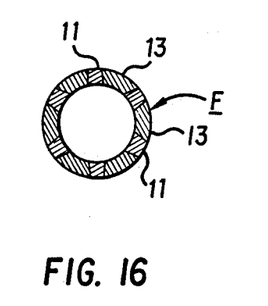
FIG. 16 and FIG. 17 are cross-sectional explanatory views showing the upper portions of the cylindrical core and the complementary core members.

First, as shown in FIG. 14, the core-expanding rod (20) is inserted and elevated through the cylindrical core (10) toward the upper end of the cylindrical core (10) to expand radially outwardly the main core members (13) of cylindrical core (10) as well as the complementary core members (11) until the circumferential molding surface (F) is formed on their outermost surfaces as shown in FIG. 16.

Then molding material is poured through the mold gate (24) into the mold cavity (23) for molding container caps and the like and cured.

Figure 17:
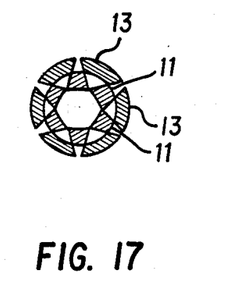

After the molding material is cured, the core-expanding rod (20) is withdrawn, as illustrated in FIG. 15, through the inside of the cylindrical core (10). Eventually, the main core members (13) of the cylindrical core (10) and the complementary core members (11) are both retracted in the radially inward direction into the position having the cross sectional view as shown in FIG. 17. Namely, the main core members (13) of the cylindrical core (10) and the complementary core plate members (11) are both completely released from the molded article (P).

then the core structure is lowered as one body with the lower mold (21) and the molded article (P) is taken out.

Although the present invention is described in conjunction with several embodiments, it must be understood that all matter contained in the foregoing description and in the drawings shall be interpreted as only illustrative, not limitative, of the invention.

I claim:

1. A core structure for a molding apparatus comprising:
   (a) a generally cylindrical core having a core body and a radially movable resilient part, the resilient part being longitudinally divided into plural arcuate segments spaced apart to define slots therebetween,
   (b) a plurality of elongated, arcuate complementary core members corresponding in external shape to said slots and fittable into said slots to form a cylinder with said segments, an end of each of said members being fixed to said generally cylindrical core, and
   (c) a core-expanding rod, which is insertable into the generally cylindrical core to radially expand the segments and the complementary core members to form a cylindrical smooth surface for molding an article thereupon.

2. A core structure of a molding apparatus according to claim 1, wherein the complementary core members are provided with a plurality of insert protrusions which are removably inserted into a plurality of inserting openings formed on the peripheral wall of the cylindrical core body of the cylindrical core and a cylindrical stopper is concentrically inserted in the cylindrical core body to hold the inserting protrusions in the inserting openings.

3. A core structure of a molding apparatus according to claim 1, wherein the complementary core members have the proximal ends thereof fixedly connected to the cylindrical core body of the cylindrical core by means of fastening bolts.

4. A core structure of a molding apparatus according to claim 1, wherein the complementary core members have the proximal ends thereof welded to the cylindrical core body of the cylindrical core.

5. A core structure of a molding apparatus according to claim 1, wherein the complementary core members have the proximal ends thereof continuously and integrally connected to a cylindrical base member and the cylindrical base member is concentrically disposed in and fixedly secured to the cylindrical core body of the cylindrical core.

6. A core structure of a molding apparatus according to claim 5, wherein the cylindrical base member is concentrically disposed in and fixedly secured to the cylindrical core body of the cylindrical core by means of fastening bolts.

* * * * *